Dec. 2, 1969  E. C. CAMPBELL  3,481,655

BEARING RETAINER AND MOUNT

Filed Nov. 15, 1967

INVENTOR
ELWOOD CARLYLE CAMPBELL

BY *John B. Finbone*

ATTORNEY

United States Patent Office 3,481,655
Patented Dec. 2, 1969

3,481,655
BEARING RETAINER AND MOUNT
Elwood C. Campbell, Raleigh, N.C., assignor to International Business Machines Corporation, Armonk, N.Y., a corporation of New York
Filed Nov. 15, 1967, Ser. No. 683,369
Int. Cl. F16c 35/06, 35/00, 43/00
U.S. Cl. 308—26                                9 Claims

ABSTRACT OF THE DISCLOSURE

A molded single piece bearing retainer having an annular radially disposed end portion and a plurality of circumferentially disposed axially extending resilient fingers, the outer surfaces of which in cooperation with the end portion position and clamp, the retainer in an aperture in a wall, plate or other machine part and the inner surfaces of which in cooperation with the end portion, clamp the bearing within the retainer and position it within the aperture in the wall, plate or other machine part.

BACKGROUND OF THE INVENTION

Field of invention

The invention relates to shaft bearings and more particularly to retainers for shaft bearings which may be utilized for supporting the bearing within apertures in walls, plates, or other machine parts as required.

Prior art

Many functionally satisfactory bearing retainers are currently available. However, in each instance, they are either expensive to manufatcure and/or difficult to assemble. Many do not provide for self-alignment. Those that have provision for self-alignment are generally unduly complicated, expensive to manufacture and difficult to assemble.

SUMMARY OF THE INVENTION

The invention contemplates a bearing retainer for retaining a bearing within an opening in a machine part and comprises, a radially disposed end member, a plurality of circumferentially disposed resilient fingers extending axially from said end member, shoulder means formed on the circumferentially outward surfaces of said fingers for clamping the retainer in an opening in cooperation with the said radially disposed end member and shoulder means formed on the circumferentially inward surfaces of said fingers for holding a bearing in cooperation with the said radially disposed end member.

One object of the invention is to provide a bearing retainer which is inexpensive to manufacture and easily assembled into a machine.

Another object of the invention is to provide a bearing retainer as set forth above which may be molded as a single element.

A further object of the invention is to provide a bearing retainer as set forth above which permits self alignment of the bearing retained thereby.

Another object of the invention is to provide a bearing retainer which permits accurate location of a bearing in the wall, plate or machine part.

The foregoing and other objects, features and advantages of the invention will be apparent from the following more particular description of a preferred embodiment of the invention, as illustrated in the accompanying drawings.

DESCRIPTION OF THE PREFERRED EMBODIMENT

Figure 1:
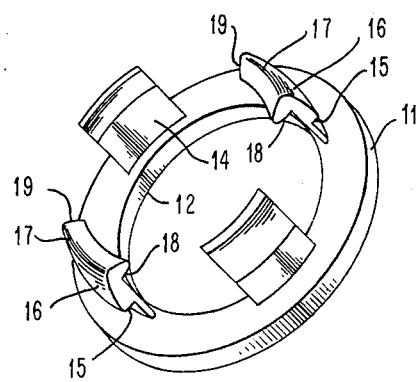
FIGURE 1 is a perspective view of a novel bearing retainer constructed in accordance with the invention.

The novel retainer 11 shown in FIGURE 1 is a unitary molded plastic body and includes an annular portion 12 which is oriented at right angles to the rotational axis of the bearing which it is to retain. Four resilient fingers 14 are circumferentially disposed about the annular portion 12 and extend in the axial direction on one side only of the annular portion 12.

Each resilient finger 14 is rectangular in cross section where it intersects the annular portion 12. The circumferentially outward surface is provided with an outwardly extending shoulder 15 and the circumferentially outward surface 16 tapers back from shoulder 15 to an apex 17 at the point most removed from annular portion 12. The distance in the axial direction between shoulder 15 and annular portion 12 accommodates the thickness of the element 20, FIGURE 2, within which the bearing is to be retained.

Element 20 may be a wall, plate or other member of a machine within the bearing is to be mounted and will henceforth be referred to as wall 20. When reference is made to wall 20, it is to be understood that the member thus identified may be a wall, plate or other machine member within which a bearing is to be retained.

The circumferentially inwardly facing surface of each finger 14 is provided with an inwardly extending shoulder 18 and the circumferentially inward facing surface 19 which tapers back from shoulder 18 to the apex 17. The distance between shoulder 18 and annular portion 12 in the axial direction accommodates the width of the bearing 30, FIGURE 3, which is to be retained in the wall 20.

Figure 2:
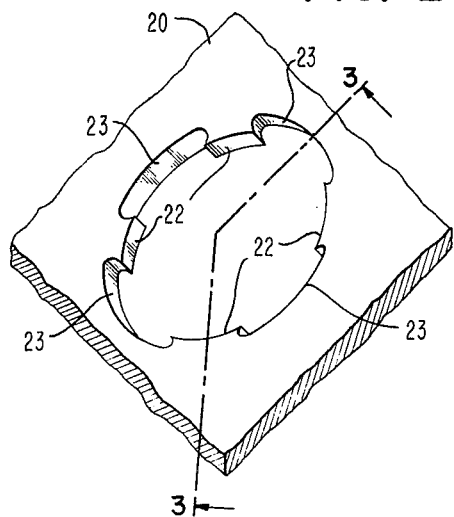
FIGURE 2 is a perspective view of a wall, plate or other machine part with a bearing locating aperture suitable for accepting the novel retainer shown in FIGURE 1; and, FIGURE 3 is a sectional view taken in the line 3—3 of FIGURE 2 showing a complete assembly of bearing and retainer mounted in the aperture of FIGURE 2.

A portion of the wall 20 with a suitable aperture formed therein for locating a bearing in the retainer 11 is illustrated in FIGURE 2. The aperture is generally circular and is defined by the spaced arcuate portions 22. Between each portion 22 is a recess 23 which accepts the fingers 14 with sufficient clearance so that the outer circumference of the bearing is in contact with and positioned by the arcuate portions 22 of the aperture in wall 20.

When the retainer is molded from plastic, nylon or other similar materials, this clearance is necessary. The hygroscopic nature of these materials renders them dimensionally unstable and the accuracy of location of the bearing would be inadequate if the retainer provided the locating function. With the arrangement described above, the annular portion 12 and the shoulders 18 retain the bearing 30 in the axial direction, however, radial alignment is provided by the arcuate portions 22 of the wall 20. The wall is made of metal and provides adequate dimensional stability for accurately positioning the bearing.

Figure 3:
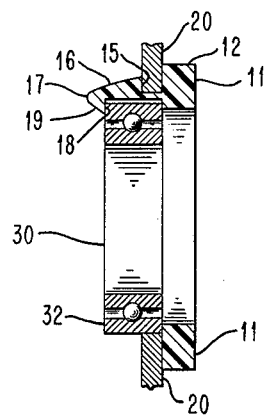
Figure 3A:
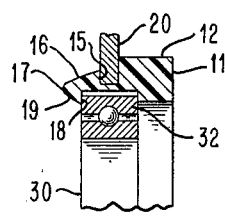

A bearing 30 and a retainer 11 are shown in assembled relationship in FIGURE 3. Assembly may be accomplished by inserting the retainer in the aperture first and then inserting the bearing into the retainer and the aperture. Self alignment is provided by the resiliency of the fingers 14 and the clearance provided between the arcuate portions 22 and the outer race 32 of the bearing 30. The partial cross sectional view shown in FIGURE 3a indicates how the retainer can be modified to permit the bearing 30 to be axially centered in the aperture of wall 20 if this is required.

The retainer 11 may if desired be machined rather than molded and may be made from any resilient material such as steel, bronze, etc. The economies set forth above will not, however, be achieved since molded plastic retainers, at least in quantity, will prove far less costly to manufacture than a machined retainer.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A bearing retainer for supporting a bearing within an aperture in a wall comprising,
    a member substantially larger than the aperture within which the bearing is to be positioned,
    said member including a plurality of axially projecting resilient fingers circumferentially disposed about said member,
    each of said axially projecting resilient fingers including on the outwardly facing surface thereof means for engaging the wall proximate to and extending beyond the aperture within which the bearing is to be mounted in its assembled condition, and
    shoulder means on the inwardly facing surfaces of said axially extending fingers for engaging and retaining in cooperation with said member the bearing to be mounted in the aperture.

2. A bearing retainer as set forth in claim 1 which is a unitary structure.

3. A bearing retainer as set forth in claim 2 which is molded of plastic.

4. A bearing retainer for supporting a bearing within an aperture in a wall comprising;
    a member substantially larger than the aperture within which the bearing is to be positioned for engaging one side of the wall proximate the aperture,
    said member including a plurality of projecting resilient fingers disposed circumferentially about said member and extending in the axial direction of the bearing which is to be mounted in the retainer and positioned within the aperture in the wall,
    each of said axially projecting resilient fingers including, on the circumferentially outward facing surface thereof, shoulder means for engaging the other side of the said wall proximate the aperture and in cooperation with said member fixedly position the retainer with respect to the aperture, and
    shoulder means on the circumferentially inwardly facing surfaces of said axially extending fingers for engaging the bearing and clamping it in the axial direction between the member and the said shoulder means on the inwardly facing surfaces.

5. A bearing retainer as set forth in claim 4 which is a unitary structure.

6. A bearing retainer as set forth in claim 5 which is molded of plastic.

7. A bearing retainer as set forth in claim 4 in which said aperture within which the bearing is to be retained is defined by a plurality of spaced arcuate sections defining a circle separated by radially outwardly extending recesses within which the axially projecting fingers reside whereby the bearing is radially positioned by the spaced arcuate sections of the apertured wall.

8. A bearing retainer for retaining a bearing within an aperture in a wall comprising,
    a radially disposed end member,
    a plurality of circumferentially disposed resilient fingers axially extending therefrom,
    shoulder means on the circumferentially outward facing surfaces of said fingers for engaging the wall contiguous the aperture and in cooperation with the radially disposed end member clamping the retainer within the aperture, and
    shoulder means on the circumferentially inward facing surfaces of said fingers for axially retaining a bearing in cooperation with said radially disposed end member.

9. A bearing retainer as set forth in claim 8 in which the aperture within which the bearing is to be retained is defined by a plurality of spaced arcuate sections, defining a circle, separated by radially outward extending recesses within which the axially extending fingers reside whereby the bearing is radially positioned by the spaced arcuate sections.

References Cited

UNITED STATES PATENTS

| 3,050,352 | 8/1962 | Moxley | 308—184 |
| 3,164,054 | 1/1965 | Biesecker | 308—15 X |
| 3,301,612 | 1/1967 | Thomas | 308—184 X |
| 3,306,679 | 2/1967 | Stokely | 308—26 |
| 3,367,728 | 2/1968 | Labbie | 308—26 |

FOREIGN PATENTS 784,222 10/1957 Great Britain.

CARROLL B. DORITY, Jr., Primary Examiner

U.S. Cl. X.R.

308—184, 236